United States Patent [19]

Ferrando

[11] Patent Number: 5,283,138
[45] Date of Patent: Feb. 1, 1994

[54] LIGHTWEIGHT ZINC ELECTRODE
[75] Inventor: William A. Ferrando, Arlington, Va.
[73] Assignee: The United States of America as represented by the Secretary of the Navy, Washington, D.C.
[21] Appl. No.: 97,181
[22] Filed: Jul. 27, 1993
[51] Int. Cl.⁵ .................. H01M 4/38; H01M 4/48; H01M 4/66
[52] U.S. Cl. .................. 429/217; 429/229; 429/231; 429/245
[58] Field of Search ............ 429/231, 229, 217, 245

[56] References Cited
U.S. PATENT DOCUMENTS
4,797,190 1/1989 Peck .................. 429/190 X Primary Examiner—John S. Maples
Attorney, Agent, or Firm—John D. Lewis; Roger D. Johnson

[57] ABSTRACT

A light weight zinc electrode made of
(1) a sintered mat of copper metal coated graphite fibers; and
(2) a composite material of zinc active material and a hydrogel dispersed in a solid, impervious, inert polymer matrix, wherein the composite material surrounds the individual copper metal coated graphite fibers of the sintered mat which support the composite material and provide paths of electrical conductivity throughout the composite material.

12 Claims, 3 Drawing Sheets

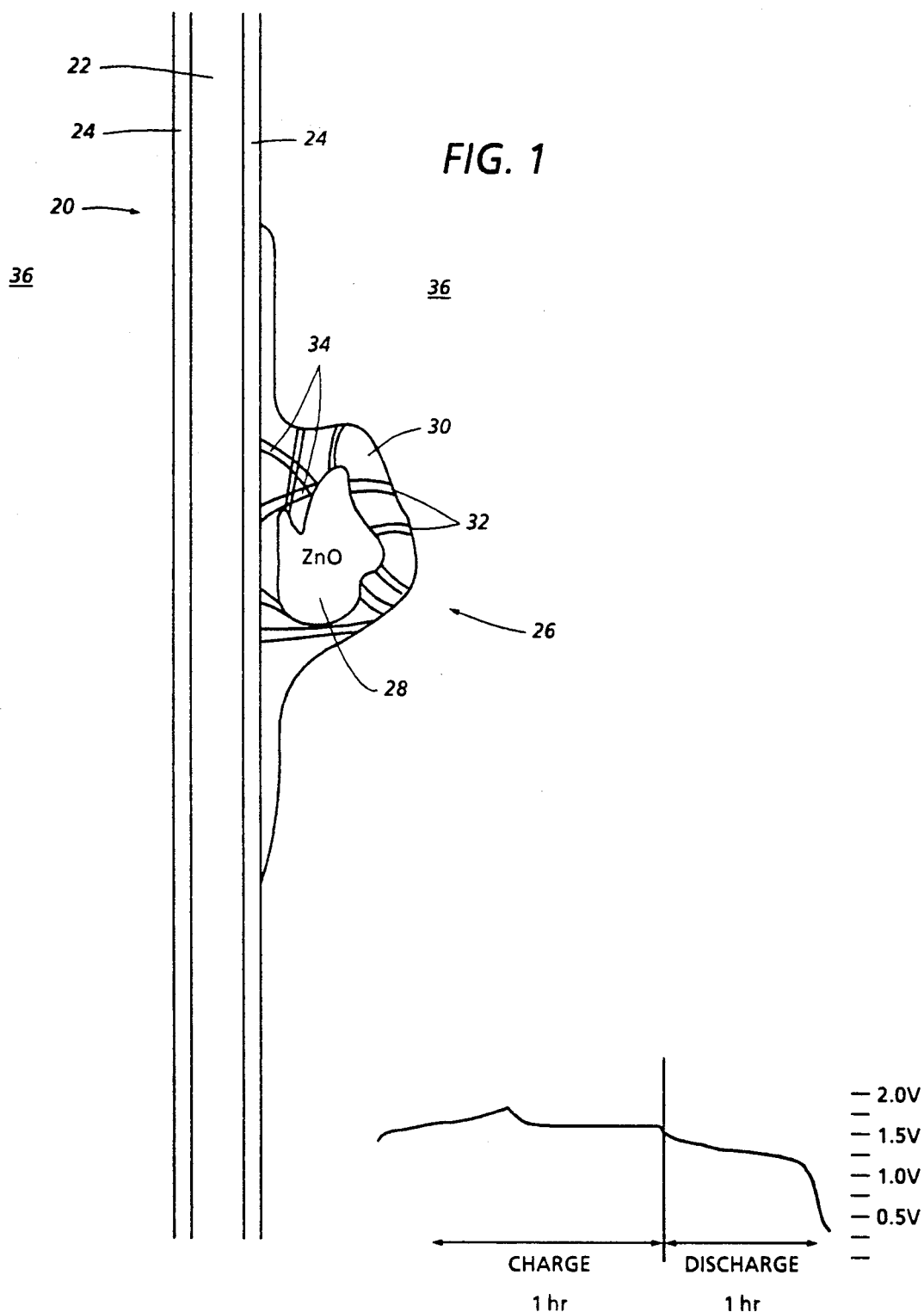

LIGHTWEIGHT ZINC ELECTRODE

BACKGROUND OF THE INVENTION

This invention relates to electrochemical cells and more particularly to zinc electrodes for electrochemical cells.

Development of a stabilized zinc secondary electrode is desirable for several good reasons. Zinc is a quite abundant and reasonably inexpensive metal. Its electrode discharge potential is relatively high and equivalent weight low. The zinc electrode in common construction shows good electrical conductivity and is capable, therefore, of showing good high rate discharge capability. Finally, zinc has been found to be more environmentally benign than most other metals.

Unfortunately, the slight solubility of zinc in the electrolyte produces an irreversibility on cycling. Some zinc goes into solution during charge, which is replated upon discharge. The nonuniformity of this process, however, gives rise to dendritic penetration of the separator and densification of the active material. The former causes shorting of the cell, while the latter results in gradual loss of capacity.

Much research has been devoted to stemming this zinc migration in secondaries. Some have used electrolyte additives to decrease zinc solubility. Others have added alloying compounds to the electrode itself. Although undeniable progress has been achieved, these approaches have yet to be completely satisfactory.

Robert L. Peck in U.S. Pat. No. 4,797,190, titled, "Ionic Semiconductor Materials and Applications Thereof," discloses an ionic transport membrane composite which includes from 10 to 50 weight percent of a hydrogel dispersed within a nonporous matrix material. Peck also teaches that by adding zinc or zinc oxide, as well as graphite powder or metal powder or fibers for conductance, to the composite and attaching the composite to a copper plated stainless steel grid, a zinc electrode can be produced. The electrode is resistant to zinc dendrite formation. However, carbon or graphite powder provides relately poor conduction. Metal powder or fibers, while good conductors, add substantial weight to the electrode. Similarly, standard metal grids or current collectors, such as copper plated stainless screens, add substantial weight to the electrode.

It would be desirable to produce a zinc electrode which possesses the features of the Peck electrode but which is lightweight.

SUMMARY OF THE INVENTION

Accordingly, an object of this invention is to provide a new zinc electrode.

Another object of this invention is to provide a lightweight zinc electrode.

A further object of this invention is to provide a lightweight zinc electrode that is resistant to zinc dendrite formation.

These and other objects of this invention are accomplished by providing:

a zinc electrode comprising

A. a sintered mat of copper metal coated graphite fibers; and

B. a zinc active material/hydrogel/inert polymer matrix composite material comprising (1) from about 50 to about 90 weight percent of a zinc active material that is zinc, zinc oxide, zinc hydroxide, or mixtures thereof wherein the weight percentage is based on the equivalent amount of zinc oxide, and with (2) the remainder of the zinc active material/hydrogel/inert polymer matrix material composite being a hydrogel/inert polymer matrix composite material comprising (a) from about 10 to about 50 weight percent of the hydrogel, and with (b) the remainder of the hydrogel/inert polymer matrix composite material being an impervious, solid, inert polymer matrix , wherein the zinc active material and the hydrogel are each dispersed within the inert polymer matrix;

and wherein the zinc active material/hydrogel/inert polymer matrix material composite surrounds the individual copper metal coated graphite fibers of the sintered mat and the copper metal coated graphite fibers provide paths of electrical conductivity throughout the zinc active material/hydrogel/inert polymer matrix composite material.

BRIEF DESCRIPTION OF THE DRAWINGS

A more complete appreciation of the invention and many of its attendant advantages thereof will be readily appreciated as the same becomes better understood by reference to the following detailed description when considered in connection with the accompanying drawings wherein:

FIG. 1 is a schematic drawing illustrating the relationship between the components of the zinc electrode of this invention;

FIG. 2 is a graph of the 15th charge/discharge cycle of the zinc electrode in example 3;

FIGS. 3 and 4 are discussed in example 4.

DETAILED DESCRIPTION OF THE PREFERRED EMBODIMENT

Figure 3:
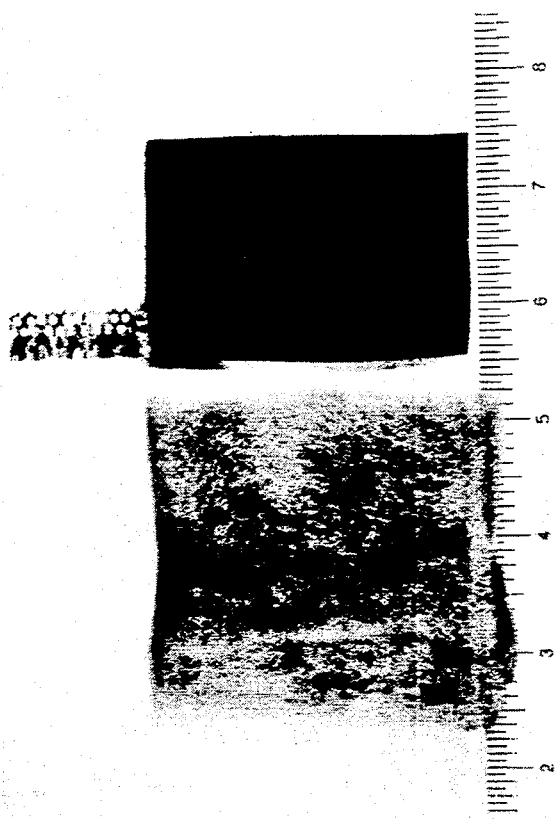
FIG. 3 is a photograph showing copper metal coated graphite fiber mats in the unsintered (left side) and sintered (right side) states.

The present invention provides a light weight zinc electrode which is made of a sintered mat of copper metal coated graphite fibers which functions as a support grid and current collector for a zinc active material/hydrogel/inert polymer matrix composite material. The zinc active material/hydrogel/inert polymer matrix composite material is melt pressed or injection molded into the sintered copper-coated graphite fiber mat so that the composite material is attached to and surrounds the fibers.

FIG. 1 is a schematic which represents a portion of one fiber in the mat as used in the battery. Shown is the copper metal coated fiber 20 which is made of the graphite fiber 22 and the copper metal coating 24. Attached to the fiber 20 is a portion of zinc active material/hydrogel/inert polymer matrix composite material 26 which comprises a zinc active material 28 (e.g. ZnO) substantially uniformly dispersed in a matrix of an inert, impervious, nonporous polymer 30. Hydrogel channels 32 and 34 are formed by substantially uniformly dispersing the hydrogel within the inert polymer matrix 30. Shown are hydrogel channels 32 which lead from the zincate saturated 38% KOH electrolyte 36 to the zinc active material 28. Other hydrogel channels 34 provide electron paths from the zinc active material 28 to the copper coating 24 of the copper coated graphite fiber 20 of the current collector/support grid.

Applicant hereby incorporates by reference in its entirety U.S. Pat. No. 4,797,190, which is titled, "Ionic Semiconductor Materials and Applications Thereof," which issued on Jan. 10, 1989 to Robert L. Peck. Specifically Peck teaches a semiconductor membrane composite comprising an inert, solid, impervious, nonporous polymer matrix with hydrogel dispersed within the polymer matrix. Peck (column 3, line 67 through column 4, line 2) discloses polyvinylidene chloride, polyvinyl chloride, polyvinylidene fluoride, polyethylene, polypropylene, urethane, and phenol formaldehyde as the preferred matrix polymers Peck (column 3, lines 59-66) teaches that synthetic long chain polymeric hydrogels such as polyethylene oxide, polyacrylic acid, and polyacrylamide are preferred. Peck also discloses that hydrogels from natural sources such as hydroxethyl cellulose, gelatin, pectin, cellulose, and starch may also be used but are less preferred. Peck (column 1, lines 2-10) also discloses coupling agents that may be added to bond the hydrogel to the matrix polymer and thus reduce the leaching of the hydrogel from the matrix. Preferred coupling agents include polyacrylic acid, phenolic resin, cellulosic titanate, carbon, lignin, and silica.

Peck (U.S. Pat. No. 4,797,190 which is incorporated by reference in its entirety) also discloses methods of making the hydrogel/polymer matrix semiconductor membranes at column 9, line 62 through column 16, line 2, which includes examples 1 through 19. The present specification in examples 1-3 provides further teachings.

Example 23 of Peck discloses a zinc electrode that is prepared by adding zinc oxide to a hydrogel/inert polymer matrix composite. Peck also teaches that it is necessary to add carbon or metal particles or fibers to the membrane to make it electrically conducting. Peck then attaches the zinc oxide/hydrogel/matrix polymer electrode membrane to a copper plated stainless steel screen.

In the electrode of the present invention the stainless steel screen of Peck is replaced with a sintered mat of copper metal coated graphite fibers. This copper coated graphite fiber mat is considerably lighter than the solid metal grid of Peck. Moreover, the mat is composed of a multitude of copper coated thin (e.g., ~10 micron) graphite fibers. The zinc active material/hydrogel/inert polymer matrix composite material is hot pressed into the mat so that the composite surrounds the fibers of the mat. As a result there is a network of fine copper coated graphite fibers running throughout the zinc active material/hydrogel/inert polymer matrix composite material which provides electric conductivity through the composite material. This eliminates the need for the 8 percent added weight of loose carbon particles and fibers which Peck must add in his example 23 to provide electrical conductivity. Moreover, the copper metal coated graphite fibers provide much better electrical conductivity than simple graphite carbon fibers and powder do. In Example 1, an implanted graphite fiber mat had a resistance of 2-2.5 ohms. In contrast, an identical graphite fiber mat with a one micron coating of copper metal had a resistance of 0-0.1 ohms. Peck does teach that metal powder or fibers may be used in place of carbon as a conductive material. Copper, for example, is an excellent conductor. However, Copper has a specific density of 8.96 g/cc and thus provides much less surface per gram. A cell using enough copper powder or fibers to provide good electrical conductivity throughout the zinc active material/hydrogel/inert polymer matrix composite material would be very heavy.

The electrode grid for the present invention is produced by coating high density graphite fibers in the form of a mat or web with copper metal. This can be done by a conventional electroless process such as that used in example 4. The copper coating will preferably be from about 0.5 to about 2 microns thick, with a coating of about 1 micron thick being more preferred. The copper metal coated graphite fiber mat is then sintered using a conventional sintering technique such as that used in example 4. "High density graphite fibers" refer to fibers having a density of more than 1.80 g/cm$^3$, preferably more than 1.90 gm/cm$^3$, and more preferably more than 1.95 g/cm$^3$. The theoretical maximum density for graphite is 2.1 g/cm$^3$.

An example of a suitable graphite fiber is available from the Union Carbide Corporation, Carbon Products Division under the trade name "Thornel", Type P mat, Grade VMA. Union Carbide technical information bulletin No. 465-225 describes "Thornel" mat grade VMA as "composed of high-strength, high-modulus carbon or graphite filaments in a random-layered orientation. The fine diametered filaments are one to three inches long and are mechanically bonded to form a continuous web of material 0.4 inches thick, 22 inches wide that is supplied in rolls approximately 40 feet long." The bulletin also lists the following properties for "Thornel" mat grade VMA:

TABLE 1

TYPICAL PROPERTIES AND CHARACTERISTICS OF "THORNEL" MAT GRADE VMA

| PROPERTY | U.S. CUSTOMARY UNITS-VALUE |
|---|---|
| Filaments | |
| Tensile Strength lb/in$^2$ | 200,000 |
| Tensile Modulus × 10$^6$ lb/in$^3$ | 35 |
| Density lb/in$^3$ | .072 |
| Electrical Resistivity 10$^4$ ohm-cm | 12 |
| Diameter $\mu$ | 9 |
| Surface Area m$^2$/g | 0.4 |
| Carbon Assay % | 98 |
| pH - | 6 |
| Mat | |
| Areal density lb/ft$^2$ | 0.07 |
| Bulk Density lb/ft$^3$ | 2.25 |
| Tensile Strength (long) lb/in width | 0.8 |
| Tensile Strength (trans.) lb/in width | 0.8 |
| Electrical Resistivity (trans.) 10$^4$ ohm-cm | 7000 |
| Thermal Conductivity Thickness BTU in/h/ft$^2$ °F. | 0.24 |

William E. Chambers in an article entitled "Low-Cost High-performance Carbon Fibers," *Mechanical Engineering*, Dec. 1975, pp. 38-39 describes the process for making the "Thornel" Type P (pitch) carbon fibers. The dimensions of the fibers are not a critical feature of this invention, but rather are chosen for certain practical reasons. For example, the smaller the diameter of the fiber, the larger the effective area of the sintered nickel grid will be. Thus, it is contemplated that fibers with diameter less that the 9 microns may be used. On the other hand, short fibers will produce sintered nickel grids that require support screens and thus added weight. Tests have demonstrated that longer fibers (e.g., one to three inches) produce sintered nickel grids which do not require support screens.

Carbon or graphite fibers produced by charring or graphiticizing rayon, cellulose, or similar fibers have low densities and therefore are not suitable for this invention. Sinter copper-coated grids made of these fibers will swell and disintegrate during cycling of alkaline nickel cells. Unlike the dense graphite or carbon fibers used in the present invention, these lower density fibers appear to have larger pores or fissures which are not fully protected by the copper coating from attack by the KOH electrolyte.

The electrode is produced by hot pressing the zinc active material/hydrogel/inert polymer matrix composite material into the sintered copper metal coated graphite fiber mat. As a result of this hot pressing procedure the zinc active material/hydrogel/inert polymer matrix composite material surrounds the individual copper coated graphite fibers of the sintered mat. The copper coated graphite fibers provide electrical conduction paths throughout the composite material and also provide physical support for the composite material. The copper coated graphite fibers of the sinter mat are interconnected to form an electrical grid from which electrical current can be drawn.

Examples 2 and 3 illustrate this procedure by hot pressing (195° C.) a zinc active material/hydrogel/inert polymer matrix composite material of zinc oxide (active material) and polyacrylic acid (hydrogel) dispersed within a solid, nonporous polypropylene matrix into a sintered copper coated (1 micron thick) thornel graphite mat using steel plates. There was a problem with the composite material sticking to the steel. This can be avoided or minimized by using a proper DAG coating on the steel plates or most preferably by using teflon coated steel plates.

The zinc active material when added may be in the form of zinc, zinc oxide, zinc hydroxide, or mixtures thereof, with zinc oxide being the preferred form. The weight percentage ranges are based on all of the zinc active material being in the form of zinc oxide. When zinc or zinc hydroxide are added the weight amount used should be adjusted accordingly. The zinc active material (ZnO or equivalent) preferably comprises from about 50 to about 90 and more preferably from 65 to 80 weight percent of the zinc active material/hydrogel/inert polymer matrix composite material with the hydrogel and the inert matrix polymer comprising the remainder. These percentages are based on the zinc active material, the hydrogel, and the inert matrix material being dry.

The hydrogel preferably comprises from 10 to approximately 50 weight percent of the dry hydrogel/inert matrix polymer composite as taught by the Peck patent. However, for high charge/discharge applications where zincate saturated 38% KOH electrode is used, the hydrogel more preferably comprises from 10 to 30 and still more preferably from 10 to 20 weight percent of the dry hydrogel/inert matrix polymer composite with the inert matrix polymer comprising the remainder.

The preferred inert matrix polymers are solid, nonporous forms of polyvinylidene chloride, polyvinyl chloride, polyvinylidene fluoride, polyethylene, polypropylene, urethane, phenol, formaldehyde, or mixtures thereof, with polyvinylidene chloride, polyvinyl chloride, polyvinylidene fluoride, polyethylene, polypropylene, or mixtures thereof being more preferred, and with polyethylene, polypropylene, or mixtures thereof being still more preferred. Compatible copolymer such as polyethylene/polypropylene copolymers may also be used. Because the preferred use of the zinc electrode is in high discharge rate cells, the matrix polymer material should be tested for resistance to attack by 38% KOH.

As Peck teaches the preferred hydrogels include polyethylene oxide, polyacrylic acid, polyacrylamide, hydroxyethyl cellulose, gelatin, pectin, cellulose, starch, or mixtures thereof, with polyethylene oxide, polyacrylic acid, polyacrylamide, or mixtures thereof being more preferred because of their greater resistance to leaching. Of these polyacrylic acid is the most preferred and may be mixed with polyethylene oxide or polyacrylamide to increase their resistance to leaching. However, as the Peck patent teaches the combination of a given hydrogel and a given matrix polymer should be tested for good chemical bonding and thus resistance to leaching.

The general nature of the invention having been set forth, the following examples are presented as specific illustrations thereof. It will be understood that the invention is not limited to these specific examples, but is susceptible to various modifications that will be recognized by one of ordinary skill in the art.

EXAMPLE 1

Mixed Graphite Powder and Copper Plated Cut VMA Fibers

A combination of graphite powder and copper metallized VMA graphite fiber was used to enhance electrical conductivity of the active material mix. Graphite powder was ground from a piece of POCO graphite (Unocal Chemicals Div./Nitrogen Group, Los Angeles, Calif.). A piece of VMA Thornel graphite fiber mat (AMOCO Performance products, Inc., Greenville, S.C. 29602) was electroless copper plated to about 1 micron depth and chopped into short fibers ($\sim$0.25"). Plating of the fibers is essential for increasing the electrode utilization under higher loads. Simple addition of the same weight of copper powder to the electrode mix would not produce the desired result because the large surface area of the plated fibers allows the copper to conduct current from a significant portion of the active material, while maintaining a lightweight structure. Samples of unplated and plated mats were measured with an ohmmeter under the same conditions. The unplated piece measured 2-2.5 ohms, while the plated one 0-0.1 ohms. This gives an indication of the increase in fiber conductivity the Cu plating produces.

An active material/composite hydrogel material mix was processed using 11.1 weight percent polyacrylic acid (paa) (Carbopol ® 940, B.F. Goodrich Corp., Speciality Polymers and Chemicals Div., Cleveland, Ohio 44141-3247), 11.1% polypropylene (pp) (Himont USA, Inc., Wilmington, Del. 19850-5439), 5.5 weight percent graphite powder, 5.5 weight percent plated graphite fiber and 66.6 weight percent ZnO (containing about 2 weight percent HgO). The polyacrylic acid was dissolved in distilled water (30-40× powder volume) using an electric paddle stirrer at moderate speed. The graphite powder was blended into the mixture at moderate speed. The hydrogel/graphite mixture was dried at about 50° C. The polypropylene and copper plated graphite fibers were melt blended between two heated platens in a Carver hand laboratory press at about 195° C using a silicone based release dag. The ZnO was added and likewise blended into a thin slab of uniform consistency.

The slab was divided into 2 portions and hot pressed around a 5×7 cm Cu screen with tab weighing 1.45 g. The total electrode weight was 19 g. Its theoretical capacity was (19-1.45) ×0.66×0.659 Amp-hr/g= ~7.5 Amp-hr. The plate was wrapped with a layer of cellophane and nylon cloth, surrounded by commercial sintered nickel electrodes and installed in a cell container with snug, but not tight fit. The unit was filled with 38% KOH zincate saturated electrolyte. It was cycled at C/5 to 100% depth of discharge with about a 5% overcharge for about 88 cycles. Its utilization after 3 cycles was about 28%, dropping to below 10% at 50 cycles. Post cycling inspection, however, revealed virtually no densification of the active material mass. Significant swelling was observed possibly indicating insufficient polypropylene matrix to completely stabilize the hydrogel.

EXAMPLE 2

Cu Plated "Continuous" Sintered VMA Mat Substrate

Prepared a formulation of 70 weight percent ZnO, 10 weight percent polyacrylic acid and 20 weight percent polypropylene as described in Example 1. Ground and sieved product to 270 mesh (74 micron). The intent was to infiltrate a sintered composite copper coated graphite fiber substrate with the powder by liquid suspension and hot press. A sintered plaque containing copper current collector grid and tab was used. Only a moderate amount of the powdered active material mix could be infiltrated directly into the sintered substrate. Most of the plasticized active material was introduced into the fiber substrate by spreading on its surface and hot pressing within a simple edge restraining aluminum frame. Unfortunately, sticking to the hot pressing plates was a problem. The sintered substrate was substantially torn apart during the pressing operation and had to be pushed together several times with a spatula. A more effective release dag must be found for proper execution of this operation, or preferably Teflon coated plates can be used.

A thin (~0.020") sintered Cu coated VMA graphite substrate (5×7 cm) and tab weighing 3.78 grams was used. The total electrode weight was 7.3 g. Its computed theoretical capacity was 1.6 amp-hr. The finished electrode was placed in a cell with one layer wrap each of cellophane and nylon and filled with 38% KOH saturated with zincate as in previous cases. It was cycled with 5% overcharge for about 115, 100% DoD cycles. First 8 cycles C/2, remainder C/4. Initial utilization was about 45%, decreasing to about 10% over the test.

No dendritic shorting experienced. Very little zinc redistribution was noted upon post-cycling inspection of the plate, indicating that the hydrogel is effective in retarding this. No dendrites were evident although the cellophane adhered tightly to the plate. Initial utilization was about 45% which dropped to some 10% by the end of test. This indicated a probable loss of electrical contact of the active material and current collector. Initial utilization should be able to be increased by employing a thicker sintered fiber mat which is intimately infiltrated with the active material.

EXAMPLE 3

Thicker Sintered Substrate, Altered Formulation

Changed formulation—reduced Hydrogel (polyacrylic acid) to 5 weight percent—increased polymer matrix (polypropylene) to 25 weight percent, with 70 weight percent ZnO. Again, as in example 2, the active material mix was finely ground and directly infiltrated with limited success. Apparently an even smaller particle size would be required for practical success of this approach. Unfortunately, further reduction in particle size of the active material mix will be difficult to achieve, given the mechanical and electrostatic properties of the material.

Hot pressing of the active material into the sinter was hampered by adherence of the material to the pressing plates. The sinter substrate was severely shredded and broken, however, some active material was added to the shredded substrate each time and the plates repressed. The final product was shaped as uniformly as possible with a spatula before cooling. Weight of the sintered substrate and tab was about 2 g. The final electrode weight was 8.4 g. The computed capacity was, therefore, about 3 Amp-hr.

The electrode was installed in a cell and cycled at C/3 rate as previously described. Improved results were noted, despite the processing difficulties. The utilization was about 55% after 16 cycles, 33% after 50 cycles and 25% at 75 cycles. The charge/discharge curve for the 15th cycle is presented in FIG. 2. Again, post cycling inspection revealed no dendrite problems. Some whitish areas were observed which could have been undischarged due to the local presence of an excess of polypropylene matrix. These could also have been due to some densification caused by an incomplete hydrogel encapsulation.

EXAMPLE 4

Electrocoating and Sintering of Graphite Mat

A portion of VMA graphite mat fiber (AMOCO Performance Products, Inc., Greenville, S.C. 29602) was electrolessly plated with copper and sintered. This forms a compatible composite sintered porous conducting substrate into which the combination polymer base/hydrogel/Zn active material is infiltrated. This was accomplished as described below.

Electroless copper solution constituents (Shipley Company, Newton, Mass.) were used. These consisted of a palladium containing Catalyst 9F and Accelerator #19 to activate the graphite surfaces to receive the copper. The three component copper solution bath itself was mixed using Cuposit ™ 802M (10%), 802A (5%), 802B (5%), balance distilled water (by volume). The bath was maintained at about 120° F.

The mat is first soaked in the catalyst for about 3 minutes, tamping to remove trapped air. After triple rinsing, it is transferred to the accelerator for a similar period. After again rinsing, the mat is immersed in the electroless copper solution for a period of about 20 minutes. This produces a copper coating of about 1 micron on the fibers. A portion of Cu coated VMA mat is shown in FIG. 3 (left).

Figure 4:
FIG. 4 is a SEM micrograph showing the sintered copper metal coated graphite fiber mater in more detail.

Sintering was effected by compressing the coated mat around a perforated copper current collector between two flat stainless steel plates and heating to 800° C. in hydrogen atmosphere. A product copper composite plaque is shown in FIG. 3 (right). FIG. 4 shows an SEM micrograph enlargement of same. Several sinter bonds are visible.

This material was used in fabricating the test electrodes of the previous cases above. A piece of the coated unsintered mat was chopped to provide the short fibers of example 1. The sintered product was used in pressing the electrodes of examples 2 and 3.

In further development using an appropriate fugitive diluent, the composite substrate may be infiltrated by use of direct injection molding, instead of pulling the substrate apart and laminating the material onto it in layers.

Obviously, numerous other modifications and variations of the present invention are possible in light of the foregoing teachings. It is therefore to be understood that within the scope of the appended claims the invention may be practiced otherwise than as specifically described.

What is claimed is:

1. A zinc electrode comprising
   A. a sintered mat of copper metal coated graphite fibers; and
   B. a zinc active material/hydrogel/inert polymer matrix composite material comprising
      (1) from about 50 to about 90 weight percent of a zinc active material that is zinc, zinc oxide, zinc hydroxide, or mixtures thereof wherein the weight percentage is based on the equivalent amount of zinc oxide, and with
      (2) the remainder of the zinc active material/hydrogel/inert polymer matrix composite material being a hydrogel/inert polymer matrix composite material comprising
         (a) from about 10 to about 50 weight percent of the hydrogel, and with
         (b) the remainder of the hydrogel/inert polymer matrix composite material being an impervious, inert matrix polymer,
      wherein the zinc active material and the hydrogel are each dispersed within the inert polymer matrix;
   wherein the zinc active material/hydrogel/inert polymer matrix composite material surrounds the individual copper metal coated graphite fibers of the sintered mat and the copper metal coated graphite fibers provide paths of electrical conductivity throughout the zinc active material/hydrogel/inert polymer matrix composite material.

2. The zinc electrode of claim 1 wherein the copper metal coating on the graphite fibers is from about 0.5 to about 2 microns thick.

3. The zinc electrode of claim 2 wherein the copper metal coating on the graphite fibers is about 1 micron thick.

4. The zinc electrode of claim 1 wherein the hydrogel comprises from 10 to 30 weight percent of the hydrogel/inert polymer matrix composite.

5. The zinc electrode of claim 4 wherein the hydrogel comprises from 10 to 20 weight percent of the hydrogel/inert polymer matrix composite.

6. The zinc electrode of claim 1 wherein the zinc active material comprises from 65 to 80 weight percent of the zinc active material/hydrogel/inert polymer matrix composite material.

7. The zinc electrode of claim 1 wherein the hydrogel is polyethylene oxide, polyacrylic acid, polyacrylamide, hydroxethyl cellulose, gelatin, pectin, cellulose, starch, or mixtures.

8. The zinc electrode of claim 7 wherein the hydrogel is polyethylene oxide, polyacrylic acid, or polyacrylamide, or mixtures thereof.

9. The zinc electrode of claim 8 wherein the hydrogel is polyacrylic acid.

10. The zinc electrode of claim 1 wherein the inert matrix polymer is polyvinylidene chloride, polyvinyl chloride, polyvinylidene fluoride, polyethylene, polypropylene, urethanes, phenol formaldehyde or mixtures thereof.

11. The zinc electrode of claim 10 wherein the inert matrix polymer is polyvinylidene chloride, polyvinyl chloride, polyvinylidene fluoride, polyethylene, polypropylene, or mixtures thereof.

12. The zinc electrode of claim 11 wherein the inert matrix polymer is polyethylene, polypropylene, or mixtures thereof.

* * * * *